United States Patent [19]

Dunz

[11] Patent Number: 5,264,660
[45] Date of Patent: Nov. 23, 1993

[54] HIGH-VOLTAGE SYSTEM

[75] Inventor: Thomas Dunz, Birmenstorf, Switzerland

[73] Assignee: Asea Brown Boveri Ltd., Baden, Switzerland

[21] Appl. No.: 890,248

[22] Filed: May 29, 1992

[30] Foreign Application Priority Data

Jun. 20, 1991 [DE] Fed. Rep. of Germany ....... 4120309

[51] Int. Cl.$^5$ .............................................. H01B 9/06
[52] U.S. Cl. ........................................ 174/28; 174/24; 174/29; 310/309
[58] Field of Search ............................ 174/28, 29, 24; 310/309

[56] References Cited

U.S. PATENT DOCUMENTS

| | | | |
|---|---|---|---|
| 3,515,909 | 6/1970 | Trump | 310/309 |
| 3,564,108 | 2/1971 | Schmitz | 174/28 X |
| 3,856,978 | 12/1974 | Sletten et al. | 174/28 X |
| 3,985,948 | 10/1976 | Olszewski et al. | 174/28 |
| 4,029,890 | 6/1977 | Nakata | 174/28 X |

FOREIGN PATENT DOCUMENTS

| | | | |
|---|---|---|---|
| 373120 | 6/1990 | European Pat. Off. | 174/28 |
| 1640274 | 5/1972 | Fed. Rep. of Germany . | |
| 2323379 | 11/1974 | Fed. Rep. of Germany | 174/28 |
| 2422961 | 10/1975 | Fed. Rep. of Germany . | |
| 2838358 | 3/1980 | Fed. Rep. of Germany . | |
| 3543301 | 6/1987 | Fed. Rep. of Germany . | |
| 1068970 | 5/1967 | United Kingdom | 174/28 |

Primary Examiner—Morris H. Nimmo
Attorney, Agent, or Firm—Burns, Doane, Swecker & Mathis

[57] ABSTRACT

A high-voltage system has an insulation-gas filled metallic encapsulation which surrounds active parts to which voltage is applied. A first protective coating (3) is provided on the internal surface of the encapsulation, as it is on the external surface of the active parts. As a result, a high-voltage system is provided in which a reduction of the dielectric strength of the insulating gas paths cannot occur as a result of freely mobile particles (5). This is achieved by covering the first protective coating (3) at least partially with a second protective coating (4).

13 Claims, 2 Drawing Sheets

HIGH-VOLTAGE SYSTEM

BACKGROUND OF THE INVENTION

Field of the Invention

The invention relates to a high-voltage system wherein a metallic encapsulation if filled with insulating gas and surrounds active parts to which voltage is applied.

Discussion of Background

High-voltage systems are known which comprise a grounded metallic encapsulation which is filled with insulating gas and whose internal surface situated opposite the active parts to which high voltage is applied is provided with a protective coating. This protective coating is intended to render the surface smooth so that it can be cleaned without fibers or other residues of cleaning aids being retained by surface roughness on the internal surface, as a result of which the dielectric strength of the gas insulation path would be reduced. The surface of the active parts in such systems is frequently provided with a similar protective coating.

Despite every care, electrically conductive particles always remain behind during assembly in such high-voltage systems. In addition, conductive particles may be produced as a consequence of abrasion at moving contact points or from switching residues. Said particles are as a rule freely mobile within the encapsulation and they may accumulate at certain points in such a way that the dielectric strength of the gas insulation paths is reduced.

SUMMARY OF THE INVENTION

The invention seeks to overcome drawbacks of the above-described prior art by providing a high-voltage system in which a reduction of the dielectric strength of the gas insulation paths cannot occur as a result of unfavorable accumulation of free particles.

The advantages achieved by the invention are essentially to be seen in the fact that conducting particles, which are always present in the interior of the high-voltage system, are immobilized by a specially formed protective coating in such a way that they cannot join together to form a bridge which endangers the insulation.

Other aspects of the invention are subjects of the subordinate claims.

The invention, its further development and the advantages achievable thereby are explained in greater detail below by reference to the drawings.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
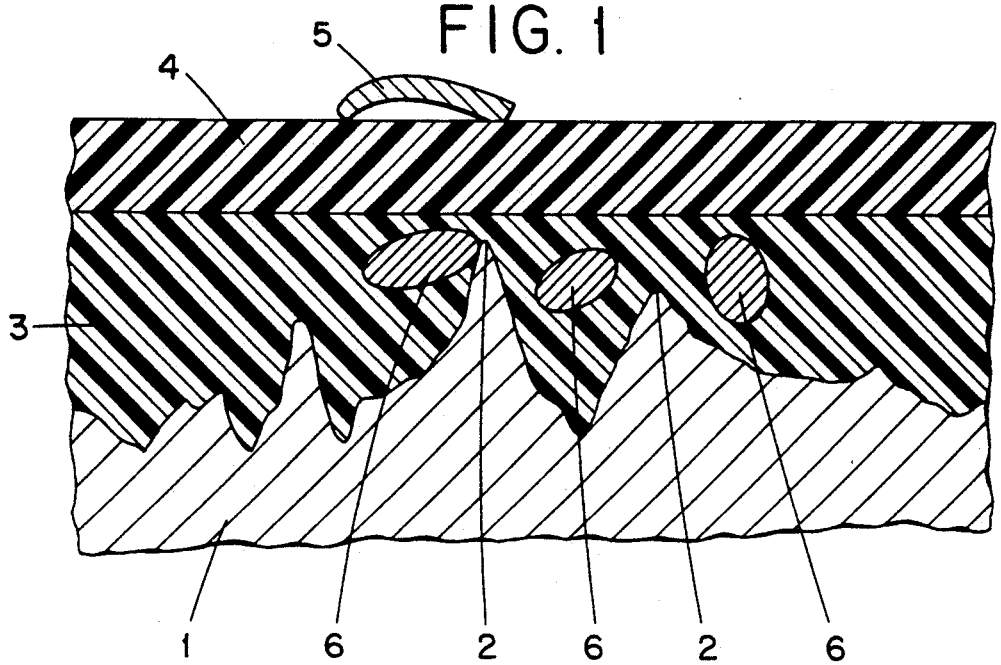
FIG. 1 shows a partial section through the high-voltage system according to the invention.

Referring now to the drawings, wherein like reference numerals designate identical or corresponding parts throughout the several views, FIG. 1 shows a much enlarged partial section through the high-voltage system according to the invention. A metallic wall 1 has peaks 2 and other irregularities at the surface. A first protective layer 3 covers the surface of the wall 1 and levels out the irregularities, so that none of the peaks 2 breaks through said protective coating. The protective coating 3 is covered by a second protective coating 4, the protective coating 4 either being applied directly to the protective coating 3 or being intimately bonded to it, for example with the aid of electrostatic forces. Electrically conducting particles 5, of which only one is shown, have accumulated on the protective layer 4. Above the protective layer 4 is the adjacent interior space of the high-voltage system which is filled with insulating gas. The wall 1 can accordingly be regarded either as part of an encapsulation of the high-voltage system or as part of its active parts. However, it is also possible to dispense with coating the active parts with the protective coating 4.

The first protective coating 3 has a comparatively high electrical conductivity or a large permittivity $\epsilon_1$, which is advantageously in the range around 30. This is achieved by introducing particles 6 into the base material for the first protective layer 3, for example an epoxy lacquer. The particles 6 may be composed, for example, of $TiO_2$ components or conductively coated $Al_2O_3$ or of a mixture of the two substances. Yet other electrically conductive substances are also conceivable for this introduction. The conducting protective coating 3 approximates the surface of the coated part to a surface which acts in a dielectrically smooth manner. The peaks 2 are no longer dielectrically harmful since they are situated inside the electrically conducting or dielectrically active protective coating 3.

Figure 5:
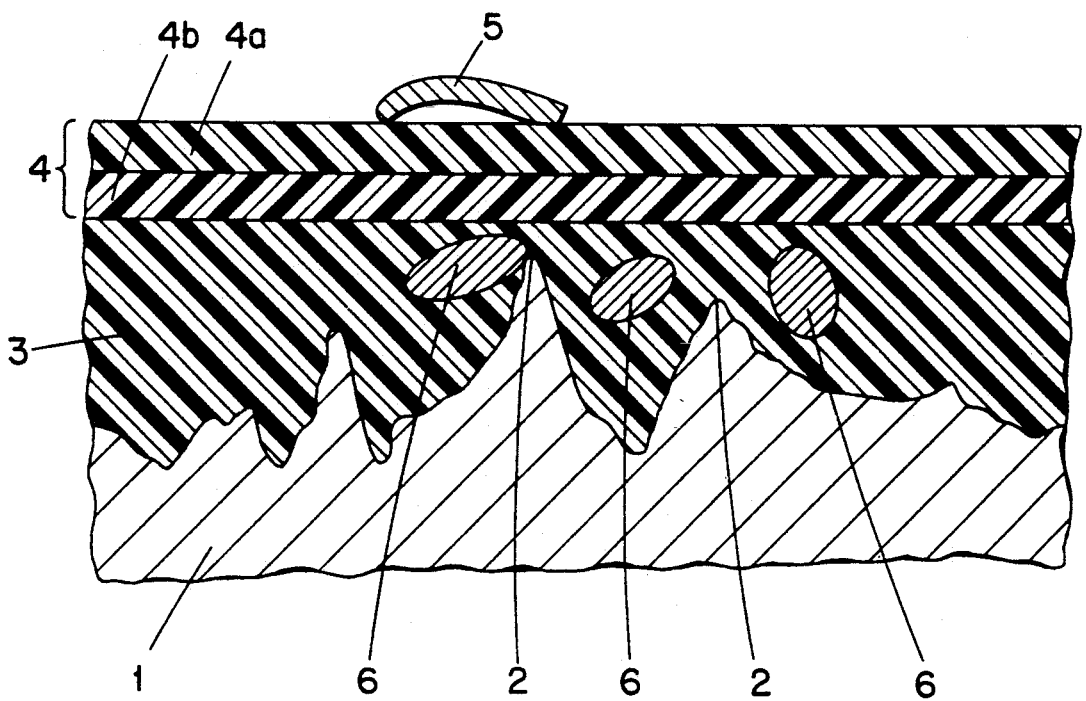
FIG. 5 shows a partial section through the high-voltage system according to the invention wherein a protective coating is provided in a multilayered construction

The second protective coating 4, on the other hand, acts in an electrically insulating manner, i.e. compared with the protective layer 3 it has a comparatively low permittivity $\epsilon_2$. Such protective coatings 4 can be produced on the basis of polyethylene. It is also possible to use foamed material based on polyethylene for this purpose. In addition, the protective layer 4 can be formed as a sheet which adheres electrostatically to the protective coating 3 and which can, if necessary, be removed. The second protective coating 4, like the first protective coating 3, may also be of multilayer construction if dielectric boundary conditions or the processibility of the material for said protective coating 4 make this necessary. For instance, as shown in FIG. 5, the second protective coating 4 can comprise a first layer 4a and a second layer 4b wherein the first layer 4a is a removable sheet which adheres electrostatically to the second layer 4b. The second protective coating 4 has, as a rule, a permittivity $\epsilon_2$ in the range from 1 to 2.

Figure 2:
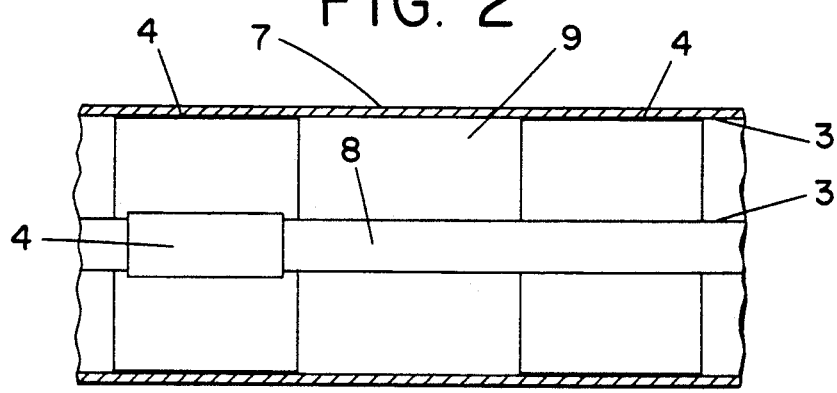
FIG. 2 shows a first embodiment of the high-voltage system according to the invention.

FIG. 2 shows a section through a cylindrically formed high-voltage system having a metallic encapsulation 7, an active part 8 and an interior space 9 which is filled with an insulating gas. The internal surface of the encapsulation 7 and the external surface of the active part 8 are provided with the first protective coating 3. It is possible to cover the entire internal surface of the encapsulation 7 and also the entire surface of the active part 8 with the second protective layer 4. However, it is also expedient, as indicated in the left-hand part of FIG. 2, to provide the protective layer 4 only in one region or in a plurality of regions of the high-voltage system, specifically on the active part 8 and opposite it on the inside of the encapsulation 7. For many applications, however, it is also sufficient, as indicated in the right-hand part of FIG. 2, to provide only the internal surface of the encapsulation 7 with the second protective layer 4, and this can be done, specifically, in one or more region of the high-voltage system. It is, however, also possible to provide the entire internal surface of the encapsulation 7 with the protective coating 4.

Figure 3:
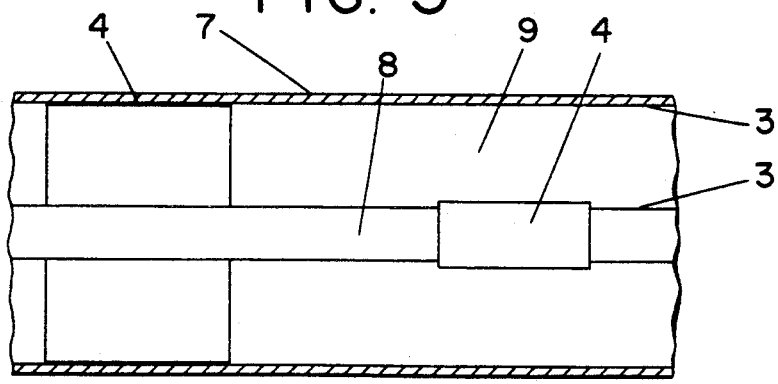
FIG. 3 shows a second embodiment of the high-voltage system according to the invention.

FIG. 3 shows a further possibility for the application of protective layers 4 in the high-voltage system. In this design, the protective coatings 4 are applied in an offset manner with respect to one another. Such designs may often be provided in the high-voltage system. In addition, it is possible to combine the designs in accordance with FIGS. 2 and 3 with one another in order to achieve in this way an optimum distribution of the protective layers 4 in accordance with the requirements of the respective high-voltage system.

For high-voltage systems in which a particularly large amount of conducting particles 5 has to be expected, it may also be expedient to widen somewhat the encapsulation 7 in the region where protective coatings 4 are provided, in which case this can be linked to a corresponding tapering of the active part 7.

Figure 4:
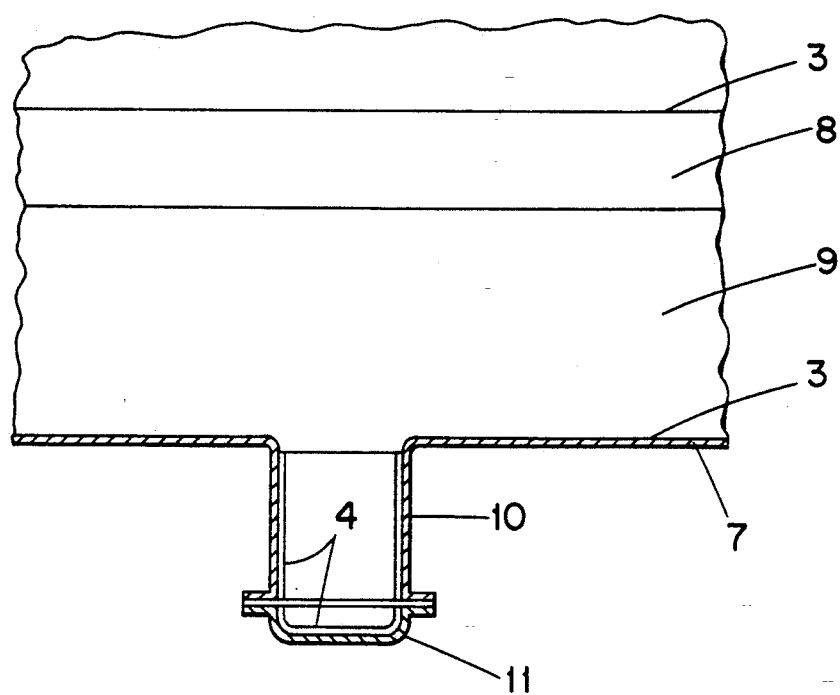
FIG. 4 shows a diagrammatic section through a particle trap.

FIG. 4 shows a high-voltage system with a connecting piece 10 which is mounted in the lower region of the encapsulation 7 and which is sealed in a gas tight manner by a lid 11. In this design, the inside wall of the connecting piece 10 and the inside wall of the lid 11 is provided with the second protective coating 4. This design is intended as a particle trap.

To explain the mode of operation, FIG. 1 may be considered in somewhat more detail. The first protective coating 3 reduces the local maximum field strength, due to the roughness, in the interior space 9 very advantageously to acceptable values. The second protective coating 4 has the task of increasing the so-called lifting field, i.e. the field strength which is necessary to cause the free, electrically conducting particles 5 to lift off. The macroscopic lifting field $E_0$ can be estimated from the capacitive coupling of the particle 5 to the respective substrate, in this case denoted as wall 1. The following relationship applies:

$$E_0 \approx \sqrt{\rho} \cdot C'(-0.3)$$

In this equation, $E_0$ is the lifting field strength, $\rho$ is the density of the particle 5, $C'$ is the mean distributed capacitance per unit area of the series-connected protective coatings 3 and 4 with respect to the rough surface of the wall 1.

Assuming that the protective coating 3 has a strong capacitive action and good conductivity, the capacitive coupling of the particle 5 can be estimated from the following relationship:

$$E_0 \geq 2.25 \cdot 10^6 V \cdot m^{0.2} kg^{-5} \sqrt{\rho} \cdot (d/\epsilon_2)^{0.3}$$

In this equation, $E_0$ is the field strength at which lifting-off of the particle 5 just fails to take place, $\rho$ is the density of the particle 5, d is the thickness of the second protective coating 4, and $\epsilon_2$ is the permittivity of the protective coating 4.

The last relationship above yields, as an estimated value, a lifting field strength $E_0 = 50$ kV/cm for an aluminum particle 5 having $\rho = 2.7 \cdot 10^3$ kg/m$^3$, having a thickness $d = 40$ μm of the protective coating 4 and having a permittivity $\epsilon_2 = 1.5$ of the protective coating 4. This value of $E_0$ is already in a range which is not as a rule exceeded in standard high-voltage systems, so that the operating safety of these systems can be advantageously increased by these simple measures.

In order also to achieve as high a listing field strength $E_0$ as possible even with a small thickness d of the second protective coating 4, the material of the protective coating 4 must accordingly have as low a permittivity $\epsilon_2$ as possible. In this way, the availability of the high-voltage system can be increased with simple means and with low material expenditure.

The particles 5 are immobilized on the protective coating 4 and cannot migrate further in the system, so that no accumulation of particles can occur which could ultimately result in insulation breakdowns. The protective coating 4 is therefore always provided at those points where the particles 5 can be immobilized without appreciably reducing the insulation strength. An accumulation of conducting particles 5 which could result in insulation breakdowns is not possible in this system. Furthermore, an accumulation of conducting particles 5 on solid-state insulations can also be reliably avoided in this way.

The protective coatings 4 are advantageously applied in those regions of the high-voltage system which are less stressed dielectrically than the remaining regions of the system. The local reinforcement of the dielectric stressing as a consequence of the dielectrically accumulated particles 5 which act as peaks does not have such a strong effect in these otherwise dielectrically less stressed regions. An endangering of the system by this controlled immobilization of particles 5 is avoided in this way with greater reliability.

It also has an advantageous effect if the second protective coating 4 is applied to the internal surface of the encapsulation in a region other than the corresponding second protective coating 4 on the external surface of the active part 8, since in this case the field disturbances due to the accumulated particles 5 are not superimposed at the same point and in this way are unable to reduce the dielectric strength unacceptably.

The arrangement of the second protective coating 4 in the vicinity of assembly openings in the encapsulation 7 or in regions of the system which are accessible during inspections is therefore expedient since the protective coating 4 can be freed in this way, easily and without additional assembly expenditure, from the accumulated particles 5. It also appears to be expedient to color the second protective coating 4 specially in order thus to render the zones to be cleaned more visible. If, on the other hand, the entire system is covered with a protective coating 4, which is quite possible in certain system configurations, this special coloring is superfluous.

It is also possible to provide only the internal surface of the encapsulation 7 completely with a protective coating 4, since a particularly good accumulation of particles 5 is to be expected there.

It is particularly advantageous to provide particle traps in high-voltage systems with protective coatings 4 in order thus to achieve a reliable retention of the particles 5 in said traps. Particle traps in already existing systems can be upgraded by newly introduced protective coatings 3 and 4 with comparatively little expense in order thus to achieve a greater operating reliability of the high-voltage system.

If the second protective coating 4 is formed as a removable sheet which adheres electrostatically to the protective coating 4, said sheet can be removed together with the accumulated particles 5. Such a possibility would be advantageous, particularly during commissionings, if, for example, said sheet could be removed with the majority of all the loose particles 5 after a test operation of the system. In this case, it would be expedient to provide at least a second layer of the second protective coating 4 which becomes operative after the removal of the sheet. The capacitive coupling between the sheet, the second layer of the protective coating 4 and the protective coating 3 can be designed in such a way that an optimum protection against freely mobile particles 5 is achieved. It is, however, also possible to dispense with a second layer of the second protective coating 4 in this case.

Obviously, numerous modifications and variations of the present invention are possible in light of the above teachings. It is therefore to be understood that within the scope of the appended claims, the invention may be practiced otherwise than as specifically described herein.

What is claimed is:

1. A high-voltage system having a metallic encapsulation which is filled with an insulating gas and which surrounds an active part to which voltage is applied, having a first protective coating both on the internal surface of the encapsulation and on the external surface of the active part, wherein:
   the first protective coating is at least partially covered with at least one second protective coating.

2. The high-voltage system as claimed in claim 1, wherein:
   the first protective coating is of electrically conducting construction or has a high permittivity, and
   the at least one second protective coating has a lower permittivity than the first protective coating.

3. The high-voltage system as claimed in claim 2, wherein:
   the first protective coating consists of an epoxy lacquer containing added, electrically conductive or dielectric particles, and
   the second protective coating consists of lacquer based on polyethylene.

4. The high-voltage system as claimed in claim 2, wherein
   the second protective coating consists of a foamed material based on polyethylene.

5. The high-voltage system as claimed in claim 3, wherein:
   $TiO_2$ particles or conductively coated $Al_2O_3$ particles or a mixture thereof are used as added conductive or dielectric particles.

6. The high-voltage system as claimed in claim 1 wherein:
   the at least one second protective coating is provided in regions of the high-voltage system which are dielectrically less stressed than its other regions.

7. The high-voltage system as claimed in claim 6, wherein:
   the at least one second protective coatings applied to the internal surface of the encapsulation in a region of the system other than the corresponding second protective coating on the external surface of the active part.

8. The high-voltage system as claimed in claim 1 wherein:
   the at least one second protective coating is provided in the vicinity of assembly openings in the encapsulation or in regions of the system which are accessible during inspections.

9. The high-voltage system as claimed in claim 1 wherein:
   the first protective coating is completely covered with the at least one second protective coating.

10. The high-voltage system as claimed in claim 1 wherein:
    the first protective coating either on the internal surface of the encapsulation or on the external surface of the active part is completely covered with the at least one second protective coating.

11. The high-voltage system as claimed in claim 6, wherein:
    the at least one second protective coating is provided in a particle trap.

12. The high-voltage system as claimed in claim 1, wherein:
    the at least one second protective coating is formed as a removable sheet which adheres electrostatically to the first protective coating, 13. The high-voltage system as claimed in claim 1, wherein:
    the at least one second protective coating comprises first and second layers, the first layer comprising a removable sheet which adheres electrostatically to the second layer.

* * * * *